(12) United States Patent
Blok et al.

(10) Patent No.: US 11,761,423 B2
(45) Date of Patent: Sep. 19, 2023

(54) ADAPTABLE SPOILER FOR A WIND TURBINE BLADE

(71) Applicant: Siemens Gamesa Renewable Energy A/S, Brande (DK)

(72) Inventors: Jesper Blok, Bramming (DK); Peder Bay Enevoldsen, Vejle (DK); Moritz Fiedel, Hamburg (DE); Florian Girschig, Skørping (DK); Alejandro Gomez Gonzalez, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 124 days.

(21) Appl. No.: 17/312,091

(22) PCT Filed: Oct. 30, 2019

(86) PCT No.: PCT/EP2019/079735
§ 371 (c)(1),
(2) Date: Jun. 9, 2021

(87) PCT Pub. No.: WO2020/120005
PCT Pub. Date: Jun. 18, 2020

(65) Prior Publication Data
US 2022/0025858 A1 Jan. 27, 2022

(30) Foreign Application Priority Data
Dec. 13, 2018 (EP) ..................... 18212375

(51) Int. Cl.
*F03D 7/02* (2006.01)
*F03D 1/06* (2006.01)

(52) U.S. Cl.
CPC ......... *F03D 7/0232* (2013.01); *F03D 1/0633* (2013.01); *F03D 7/0236* (2013.01); *F05B 2240/3052* (2020.08)

(58) Field of Classification Search
None
See application file for complete search history.

(56) References Cited

U.S. PATENT DOCUMENTS 2,428,936 A * 10/1947 Hunter .................... B64C 9/323
244/113
3,136,501 A    6/1964 Barber
(Continued)

FOREIGN PATENT DOCUMENTS

EP    1 623 111 B1    9/2008
EP    2 514 962 A1    10/2012
(Continued)

OTHER PUBLICATIONS

International Search Report and Written Opinion for PCT/EP2019/079735 dated Feb. 12, 2020.
(Continued)

*Primary Examiner* — Kayla Mccaffrey
(74) *Attorney, Agent, or Firm* — Schmeiser, Olsen & Watts LLP

(57) ABSTRACT

Provided is an adaptable spoiler for a wind turbine rotor blade, including: a base element adapted to be connected at or integrated with a rotor blade; an airfoil element being attachable to the base element and having an airfoil shaped surface to be exposed to an air flow.

13 Claims, 6 Drawing Sheets

(56) References Cited

U.S. PATENT DOCUMENTS

Figure 1:
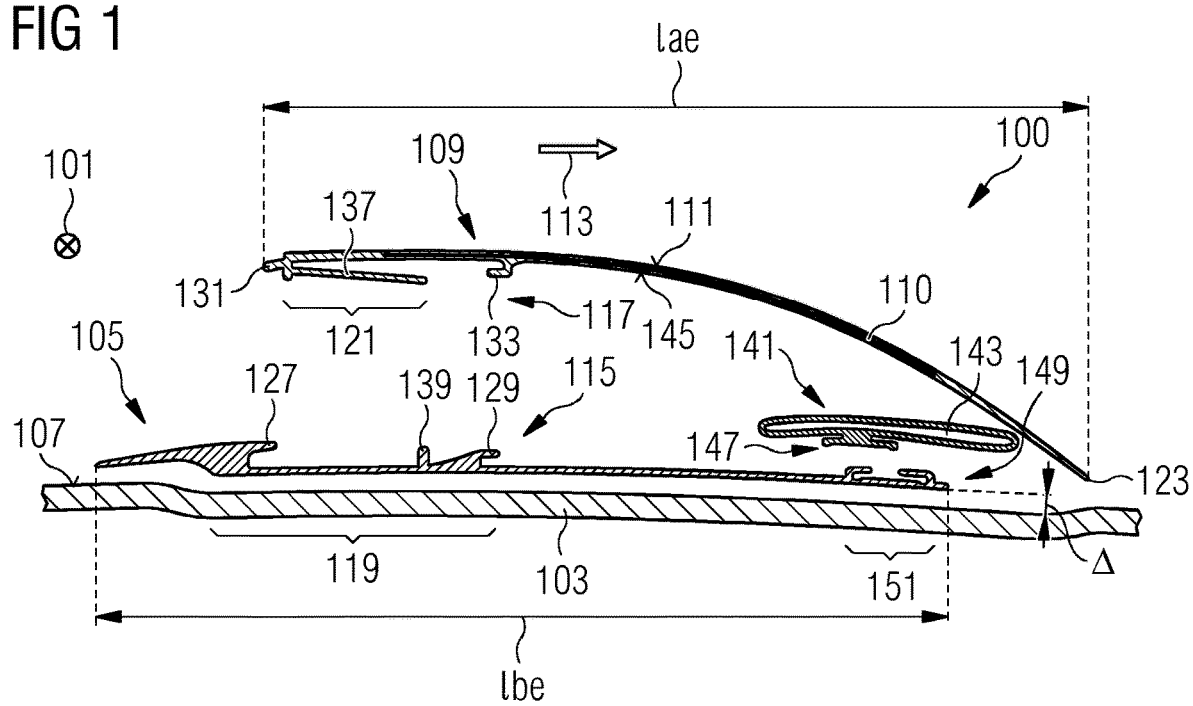

| | | | |
|---|---|---|---|
| 5,106,265 A | 4/1992 | Holzem | |
| 5,326,050 A | 7/1994 | Zell | |
| 8,851,840 B2 | 10/2014 | Hancock et al. | |
| 10,968,887 B2* | 4/2021 | Akay | F03D 1/0675 |
| 2003/0091436 A1 | 5/2003 | Stiesdal | |
| 2010/0143130 A1* | 6/2010 | Cairo | F03D 1/065 29/889.72 |
| 2011/0110777 A1 | 5/2011 | Vabdallah et al. | |
| 2012/0141271 A1* | 6/2012 | Southwick | F03D 7/0232 416/1 |
| 2012/0269640 A1* | 10/2012 | Enevoldsen | F03D 1/065 416/223 R |
| 2017/0082088 A1 | 3/2017 | Yarbrough et al. | |
| 2017/0218916 A1* | 8/2017 | Lehmann Madsen | F03D 1/0641 |
| 2018/0118332 A1* | 5/2018 | Bordoley | B64C 13/02 |

FOREIGN PATENT DOCUMENTS

| | | |
|---|---|---|
| EP | 2664791 A2 | 11/2013 |
| EP | 3 128 169 A1 | 2/2017 |
| WO | 02/29247 A1 | 4/2002 |
| WO | WO 2017012633 A1 | 1/2017 |
| WO | 2018/041420 A1 | 3/2018 |

OTHER PUBLICATIONS

European Search Report and Written Opinion of the European Searching Authority dated Jun. 19, 2019 for Application No. 18212375.2.

Taiwanese Office Action dated Sep. 2, 2020 for Application No. 108143144.

\* cited by examiner

ADAPTABLE SPOILER FOR A WIND TURBINE BLADE

CROSS-REFERENCE TO RELATED APPLICATIONS

This application claims priority to PCT Application No. PCT/EP2019/079735, having a filing date of Oct. 30, 2019, which is based on EP Application No. 18212375.2, having a filing date of Dec. 13, 2018, the entire contents both of which are hereby incorporated by reference.

FIELD OF TECHNOLOGY

The following relates to an adaptable spoiler for a wind turbine blade, relates to a wind turbine rotor blade comprising the spoiler and further relates to a wind turbine comprising the rotor blade.

BACKGROUND

A wind turbine rotor blade may have installed a flow regulating device on its surface. An example of such a flow regulating device is a vortex generator (VG). The rotor blade may further comprise a spoiler installed at the rotor blade surface. The spoiler may act in concert with the vortex generator and may influence the effect of the vortex generator depending on the state of the spoiler. The state of the spoiler may relate to a protrusion height and/or tilt angle by which the spoiler extends from or is tilted relative to other surface portions of the rotor blade. The spoiler can be used to actively suppress the function of the flow regulating device, or fully bypass the flow regulating device and cause local aerodynamic stall of the airfoil. In general, a flow regulating device may be considered to comprise a device which is capable of, for example, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine blade comprising a pneumatically actuated spoiler movable perpendicular to an airstream.

WO 2018/041420 disclose a rotor blade comprising an aerodynamic device for influencing the air flow flowing from the leading-edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

Conventional spoilers are therefore complex in construction and difficult to install them at the rotor blade. Furthermore, adaptation of a conventional spoiler to adopt different states regarding an aerodynamic influence is difficult to achieve and does not result in all circumstances and under all conditions to satisfactory results.

Thus, there may be a need for an adaptable spoiler for a wind turbine blade, there may be a need for a wind turbine blade and further there may be a need for a wind turbine, wherein the adaptable spoiler is easily manufactured, has a simple construction and allows accurate and reliable adaptation.

SUMMARY

An aspect relates to an adaptable spoiler for a wind turbine blade, comprising: a base element adapted to be connected at or integrated with a rotor blade surface; an airfoil element being, e.g., reversibly or permanently, attachable to the base element and having an airfoil shaped surface to be exposed to an air flow.

The adaptable spoiler may be adaptable in the sense that the airfoil shaped surface of the airfoil element may adopt different positions and/or orientations and/or tilt and/or shapes for influencing an air flow in a different manner. For adaptation of the state of the adaptable spoiler one or more actuators may be provided, in particular an expandable, inflatable container as will be described below in more detail. The adaptable spoiler may be installed (in particular via the base element), for example at (or close to) a front edge at a suction side of the rotor blade. The adaptable spoiler may be configured as a segmented spoiler, wherein the plural segments are installable or are installed along a longitudinal direction of the rotor blade on the rotor blade.

The airfoil shaped surface of the airfoil element may be configured (alone or in combination with at least a portion of the base element) to deflect the air depending on the state of the adaptable spoiler to a different degree. The base element as well as the airfoil element may be configured in plural segments which may be arranged side by side along a longitudinal direction of the rotor blade. The base element may carry the airfoil element in a manner such that the airfoil element may at least partly be movable or turnable relative to the base element such that the airfoil shaped surface may be set in different states, such as protrusion height/orientation/tilt or shape corresponding to the different states of the adaptable spoiler. The base element and the airfoil element are separate items which may be assembled with each other. For example, while the base element is connected at or integrated with the rotor blade, the airfoil element may be exchangeable, for example after being damaged. The airfoil element may easily be installable at an operation side of the wind turbine.

In particular, for (reversibly or permanently) attaching the airfoil element no further items or elements may be required. For example, no bolts may be required to attach the airfoil element to the base element. Furthermore, essentially no tool may be necessary to attach the airfoil element to the base element. In particular, an interlocking mechanism or click mechanism may be provided for (reversibly or permanently) attaching the base element at the airfoil element. Thereby, the airfoil element may for example be attached at the base element after the entire wind turbine has been erected at an operation side.

The airfoil element may be (reversibly or permanently) attachable to the base element such that at least a portion of the airfoil element is deformable or movable or turnable relative to the base element for allowing to adopt different structural configurations of the airfoil element, in particular the airfoil shaped surface corresponding to the different states of the adaptable spoiler. For example, the airfoil element may in a particular bending region bend upon actuating an actuator which is in contact with a portion of the airfoil element to result in a desired structural configuration of the airfoil element, in particular the airfoil shaped surface, corresponding to a desired state of the adaptable spoiler.

The air flow may relate to an air flow close to or at the rotor blade surface which is intended to be influenced by the adaptable spoiler, in particular the airfoil shaped surface of the airfoil element. Primarily, the airfoil shaped surface of the airfoil element may influence the air flow. However, also a (small) portion of the base element (e.g., the portion closer to the leading edge or the rotor blade) may contribute to interact with the air flow. According to one embodiment of the present invention, the base element does not influence at all the air flow, the base element may essentially be covered by the airfoil element and/or may be buried or may be depressed relative to a surrounding surface of the bare rotor blade.

The adaptable spoiler may comprise one or more further elements beside the base element and the airfoil element. For example, partially between the base element and the airfoil element one or more actuators may be arranged. To achieve a different state of the adaptable spoiler, the base element position and orientation relative to the rotor blade surface does not need to be changed. Thus, the adaptability of the spoiler may exclusively be achieved (e.g., using an actuator inflating/deflating an expandable container or bladder) by changing the position and/or orientation and/or tilt and/or shape of the airfoil shaped surface of the airfoil element.

The base element may comprise a plate-like structure which is mounted or connected at or integrated with the rotor blade surface. The base element may for example be mounted using an adhesive. The adhesive may be to some degree elastic to allow some deformation of the rotor blade surface during operation without affecting mounting strength. The adhesive may for example comprise a silicone, a polymer or the like.

The adhesive may for example comprise e.g., pressure sensitive adhesive tapes, an acrylic single component and/or for example moisture curing adhesives (for example silicone based) or bicomponent adhesives.

The base element may also be laminated with the rotor blade surface. The base element may also be referred to as interface plate below. The base element may be permanently attached to the rotor blade. The base element may be laminated into the structure of the rotor blade (surface), it made be glued or it may be mechanically fastened, for example using one or more bolts. The base element may be installed permanently, i.e., it is expected to remain on the blade for its entire lifetime, even though it may be replaceable or repaired if needed.

On top of the base element, the attachable/detachable airfoil element (also referred to as spoiler element) with an integrated or separate expanding element (for example inflatable, expandable container, such as a bag or a hose) may be installed. The airfoil element may be independent of or separate from an expander actuator. The airfoil element may be attached to the base element by a mechanical interlocking for example. An advantage of mechanical interlocking may be a faster installation during both, manufacturing or servicing stages, as well as the ability to install different types of airfoil elements on the same base element.

According to an embodiment of the present invention, the base element is attachable or attached to the rotor blade during the manufacturing process via an adhesive bond, alternatively, the base element may be partially over-laminated in certain areas, for example with fibre-reinforced composites. In a further alternative, the base elements may be attached to the rotor blade in a mechanical manner, for example with the use of composite screws and/or pins and/or bolts. Thereby, secure connections between the base element and the rotor blade may be achieved.

According to an embodiment of the present invention, for (e.g., reversibly or permanently) attaching the airfoil element to the base element, the airfoil element and the base element each comprise: at least one attachment portion, in particular latching portion, wherein the attachment portion of the airfoil element and the attachment portion of the base portion are configured to be fixed to each other, in particular to engage, further in particular to interlock, with each other.

Using the attachment portion of the airfoil element and the base element, the airfoil element and the base element may (e.g., reversibly or permanently) be fixed to each other. The respective attachment portion may be configured as an integrative portion of the respective airfoil element and base element. Both, the base element and the airfoil element may be manufactured from a plastic material, such as thermo-setting and/or thermoplastic material.

The respective attachment portions may have a shape at least partially complementary to each other allowing to engage the attachment portion of the airfoil element with the respective attachment portion of the base element. Thereby, for example an interlocking or catching or latching may be achieved, in particular without requiring any further elements such as pins or bolts or screws. In order to engage with each other, for example the airfoil element may temporarily be slightly deformed to latch in or click into a fixation by the respective attachment portions.

According to an embodiment of the present invention, wherein the attachment portion of the airfoil element and the attachment portion of the base portion are arranged in an upstream region according to an air flow direction, to allow deformation, in particular upward flexure (e.g., away from the rotor blade), of the airfoil element in a downstream region for adapting the spoiler into different activation states.

During normal operation of the wind turbine, the air flow may stream from the upstream region of the spoiler to a downstream region. In particular, the flow direction may substantially or essentially perpendicular to a longitudinal axis of the rotor blade, in particular being parallel to a longitudinal axis of the adaptable spoiler. The upstream region may for example cover between 10% and 50% of the extent of the base element in the air flow direction. The upstream region of the airfoil element may for example comprise 10% to 40% of an entire extent of the airfoil element in the flow direction. Thereby, changing the shape of the airfoil element in the downstream region for adapting different states of the adaptable spoiler may easily be achievable.

According to an embodiment of the present invention, the airfoil element is flexible and is, when attached at the base element, biased to press towards the base element and/or the rotor blade surface in a downstream region.

The airfoil element may, in particular in a situation, when an expandable inflatable container is fully deflated, press with a portion of a downstream part towards the base element and/or the rotor blade surface. For example, a rear edge of the airfoil element may press onto the rotor blade surface. Thereby, an essentially inactive state of the spoiler may be adopted. The more the inflatable expandable container is inflated the more the rear edge of the airfoil element may be lifted from the rotor blade surface due to the lifting force exerted by the expandable and expanding container which may be higher than the bias force exerted by the airfoil element. Thereby, while inflating the expandable container, the shape of the airfoil element achieved in a downstream region may be changed, involving in particular also tilting upwards at least a portion in a downstream region of the airfoil shaped surface of the airfoil element. When the airfoil element is flexible and pressed against the rotor blade surface in a deflated state of the expandable container (or alternatively in a deactivation state of an actuator), it may not be necessary to exert for example a force on the airfoil element towards the rotor blade exerted for example by the expandable container. Thereby, the construction may be simplified.

According to an embodiment of the present invention, for fixing the attachment portion of the airfoil element and attachment portion of the base element with each other, at least a part of one attachment portion, in particular the attachment portion of the airfoil element, is elastic and is temporarily deformed.

Thereby, for example any latching or catching mechanism may be employed. Thereby, the attachment of the airfoil element to the base element may be simplified, in particular without involving or requiring any further elements.

According to an embodiment of the present invention, the airfoil element is fibre enforced, and/or the airfoil element comprises a core made from fibre enforced material, the airfoil element further comprising a surrounding material encapsulating the core.

The airfoil element may be exposed to the air flow during normal operation of the wind turbine. Due to the load during normal operation, reinforcement of the airfoil element may be advantageous or necessary, to achieve a desired aerodynamic influence. The core may not be exposed to the air flow but may be completely embedded within the airfoil element. The core may be made of a relatively stiffer material than the material for which the surrounding material is composed.

According to an embodiment of the present invention, the attachment portion of the airfoil element and the attachment portion of the base element are attachable with each other by form fit, wherein the attachment portion of the airfoil element and/or the attachment portion of the base element comprise in particular at least one of: a protrusion; a nose; a hook; an elastic tongue; a barb.

The form fit may provide a reliable secure fixation. In particular, complementary structures of the attachment portion of the airfoil element and the attachment portion of the base element may contact each other and may interact with each other for achieving a fixation. For attaching the airfoil element at the base element, the airfoil element may be placed onto the base element and may be shifted substantially in a direction opposite to the flow direction of air during normal operation. While shifting the airfoil element, a pressing force may be exerted towards the base element to for example arrange a nose or protrusion or one or more noses or protrusions of the airfoil element below one or more protrusion of the base element.

The pressing force may be exerted against a spring force, for example exerted by an elastic tongue. The spring force exerted by the elastic tongue may for example act when the airfoil element is attached at the base element to press respective noses or protrusions of the airfoil element against respective protrusions or noses of the base element. Furthermore, an end of the elastic tongue may for example snap beside a protrusion of the base element, thereby prohibiting shifting back the airfoil element from the contact of the respective noses of the base element. Thereby, unintentional release of the airfoil element from the base element may be prohibited.

According to an embodiment of the present invention, the attachment portion of the airfoil element and/or the attachment portion of the base element, in particular the entire airfoil element and/or the entire base element, has a cross-sectional shape not changing along a span-wise (longitudinal) direction of the rotor blade, thereby in particular being manufacturable by an extrusion process. Thereby, manufacturing may be simplified and costs may be reduced.

According to an embodiment of the present invention, the spoiler further comprises at least one pin, wherein the attachment portion of the airfoil element, the attachment portion of the base element and the pin form a hinge by which the airfoil element and the base element are rotatably connected to each other, a rotation axis substantially being oriented along the longitudinal direction of the rotor blade.

A hinge may thereby in a simple manner allow to arrange the airfoil element in different tilt angles for achieving different states of the adaptable spoiler. Each, the attachment portion of the airfoil element as well as the attachment portion of the base element, may comprise teeth and slots which may inter-digitate with each other. The hinge or the pin may substantially be oriented perpendicular to a flow direction of air during normal operation. Thereby, deflection of air to different degree away from the rotor blade surface may be achieved by tilting the airfoil element relative to the base element at different angles by rotation around a hinge axis defined by the pin.

According to an embodiment of the present invention, at most an upstream portion of the base element is to be exposed to air flow, and/or a downstream portion of the base element is substantially covered by the airfoil element, and/or the base element is partly or completely submerged below a surrounding rotor blade airfoil surface.

The base element may for example be manufactured from a relatively rough material or may comprise a rough, not smooth surface, thereby simplifying the manufacturing. The airfoil shaped surface of the airfoil element however, may have a smooth and even or glossy surface for purposely interacting with the air flow and deflect the air flow in a desired manner. The base element may be slightly or completely submerged into the rotor blade surface and may for example be flush or almost flush with the surrounding rotor blade surface. Thereby, an aerodynamic resistance due to the base element may be reduced or even avoided.

In particular, at least in a downstream region, between the base element and the airfoil element, in particular in a fully retracted state of the adaptable spoiler, space for an actuator may be provided, such as an inflatable expandable container. In particular, a chamber may be formed between the base element and the airfoil element providing space for the placement of an expander element which may work as an actuator for the spoiler.

According to an embodiment of the present invention, the spoiler further comprises an inflatable, expandable container (e.g. bag, hose) arranged in a downstream region at least partly between the base element and the airfoil element and configured to be expanded to different level to change position and/or orientation and/or shape of at least a portion of the airfoil shaped surface of the airfoil element (upon inflating, deflating), (e.g. by touching the airfoil element at a back surface).

The inflatable, expandable container may act, in particular together with a hydraulic and/or pneumatic system, as an actuator for putting the spoiler in different states regarding an aerodynamic influencing property. The container may for example be inflated with air or an inert gas, thereby expanding the container, in turn resulting in a change of the orientation and/or position and/or tilt and/or shape of at least a portion of the airfoil shaped surface of the airfoil element. Thereby, adapting the spoiler in different states, may be achieved in a simple manner. The inflatable, expandable container may for example be made from a deformable flexible material, such as rubber or the like.

According to an embodiment of the present invention, wherein the base element comprises an engagement portion in a downstream region engageable with the engagement portion of the expandable device for fixing the container at the base element. Using the engagement portion of the container and the engagement portion of the base element, the inflatable, expandable container may be fixed to the base plate or base element. In particular, the expandable container may be attached to the base element by an interlocking system. The engagement portion of the container may be formed in an integral manner. Thus, for example, the engagement portion of the container may be formed by the same material as container walls defining an inner lumen into which the fluid may be filled for inflating the container.

According to even other embodiments, the expandable container may comprise a further engagement portion which may be engaged with a further engagement portion of the airfoil element (in particular at a back-surface of the airfoil shaped surface of the airfoil element). Thereby, the airfoil element may be retracted via a drawing force exerted by the inflatable expandable container when the container is deflated. This embodiment may in particular be employed when a hinge mechanism is utilized or employed for connecting the airfoil element with the base element.

According to embodiments of the present invention, the spoiler elements, i.e., the base element and/or the airfoil element, are manufactured in single short pieces of length preferably between 20 cm and 150 cm, most preferably between 30 cm and 70 cm. Each of the spoiler elements may comprise features as described above for the adaptable spoiler, i.e., described for the base element and the airfoil element. According to an embodiment of the present invention, the spoiler elements are forced to the base element by applying a given force on them, causing the attachment points to interlock with each other.

The airfoil element may be slit on or towards the base element and may be held in place via one or more interlocking elements comprised in the respective attachment portions.

According to an embodiment of the present invention, the airfoil element is configured such that upon inflating the container: a position and/or an orientation and/or a shape of a downstream portion of the airfoil shaped surface of the airfoil element changes, while a position and/or an orientation and/or a shape of an upstream portion of the airfoil shaped surface of the airfoil element substantially remains unchanged. Thereby, in particular between an upstream region and a downstream region of the airfoil element, the airfoil element may be bent, in particular bent away from the rotor blade surface while inflating the expandable inflatable container.

According to an embodiment of the present invention, it is provided a wind turbine rotor blade, comprising: a blade airfoil surface; and a spoiler according to one of the preceding embodiments, wherein the base element is laminated to and/or is glued to and/or is mechanically fastened to the blade airfoil surface.

Furthermore, a wind turbine comprising a rotor and at least one wind turbine rotor blade according to the preceding embodiment is provided.

The aspects defined above and further aspects of embodiments of the present invention are apparent from the examples of embodiments to be described hereinafter and are explained with reference to the examples of embodiments. The following will be described in more detail hereinafter with reference to examples of embodiments but to which the invention is not limited.

BRIEF DESCRIPTION

Figure 2:
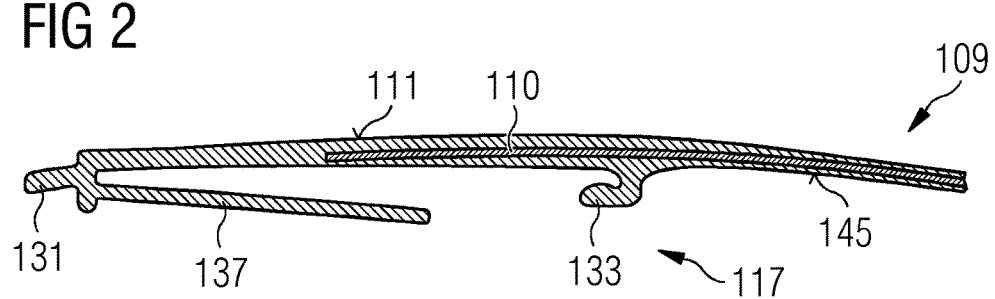
Figure 3:
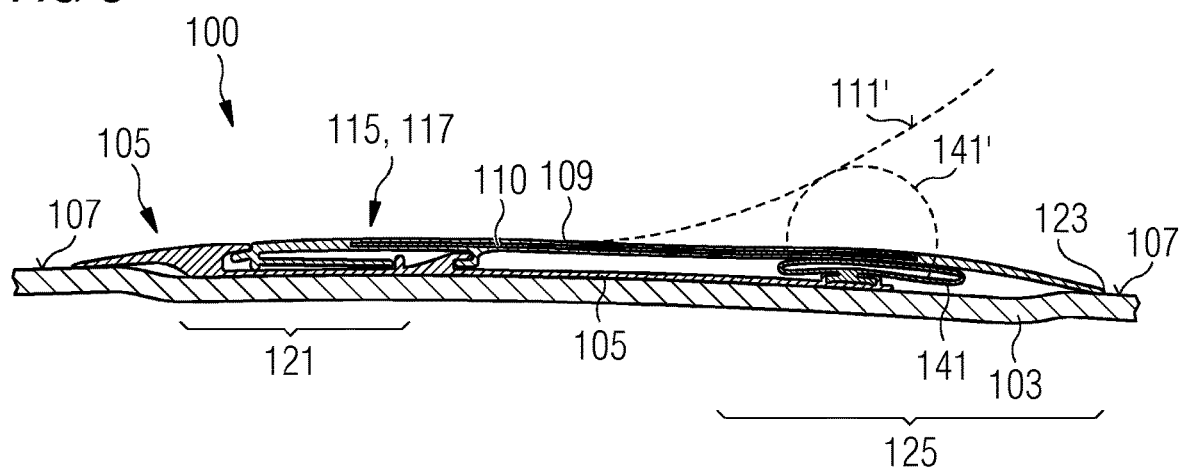
Figure 4:
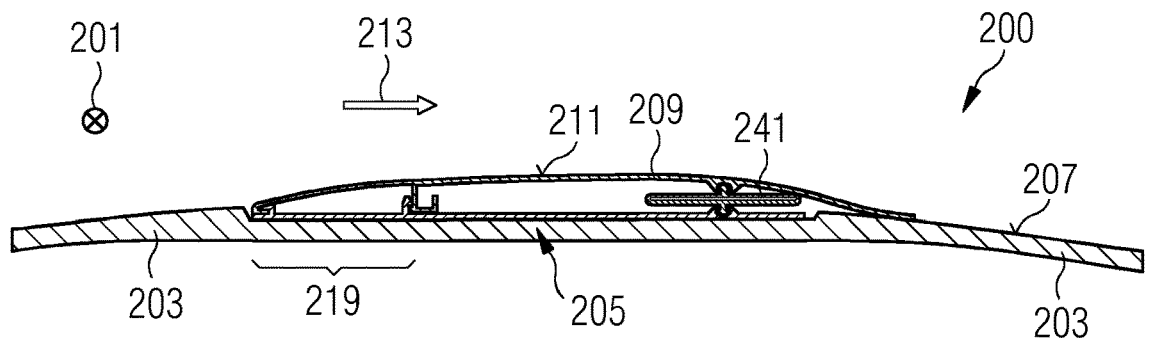
Figure 5:
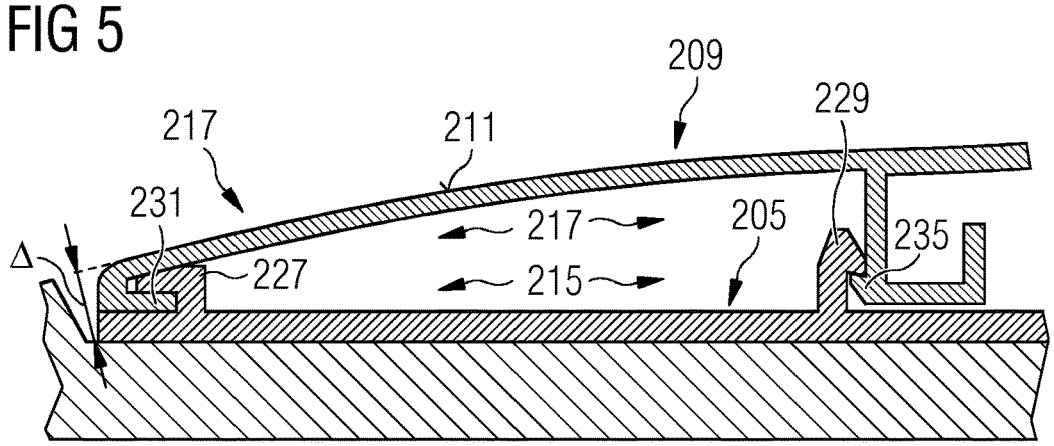
Figure 6:
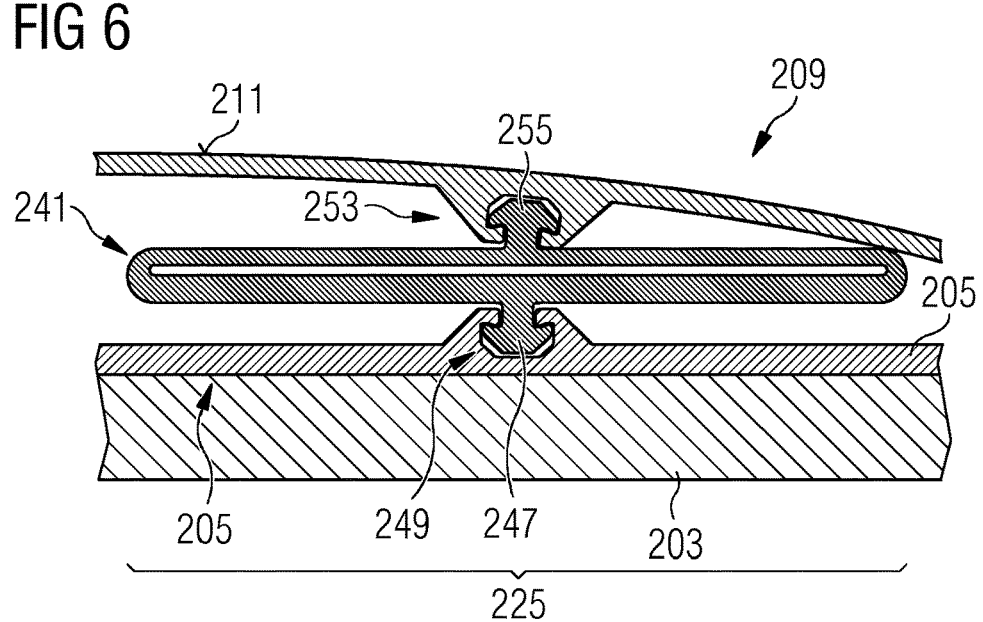
Figure 7:
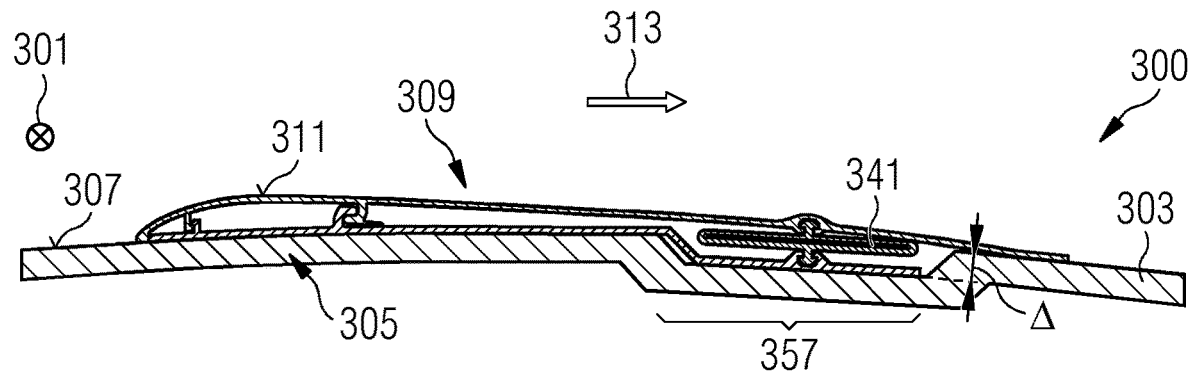
Figure 8:
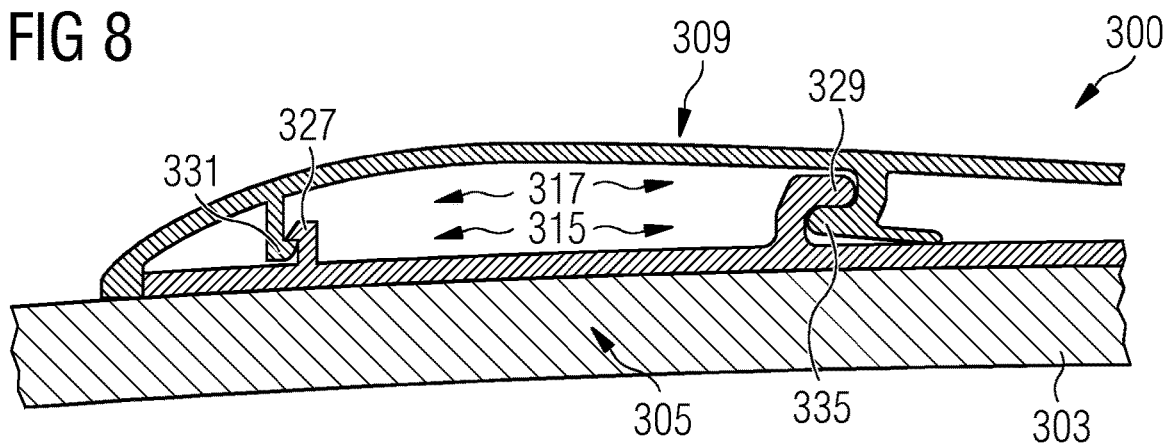
Figure 9:
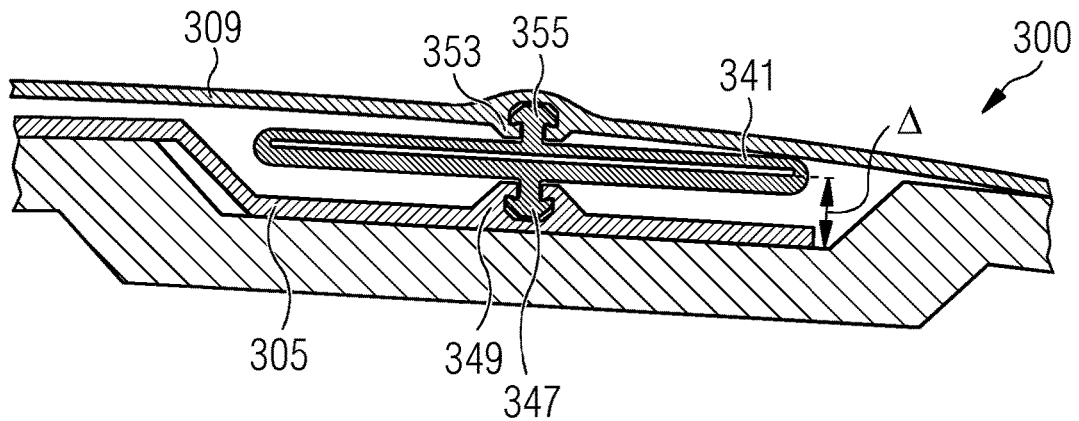
Figure 10:
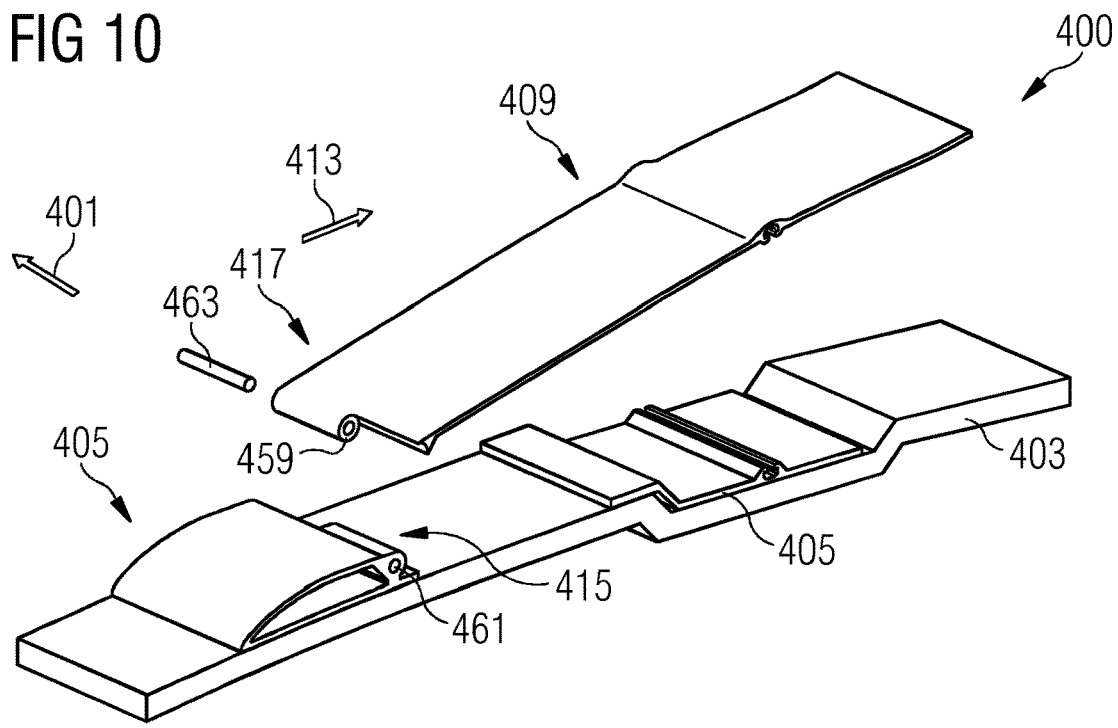
Figure 11:
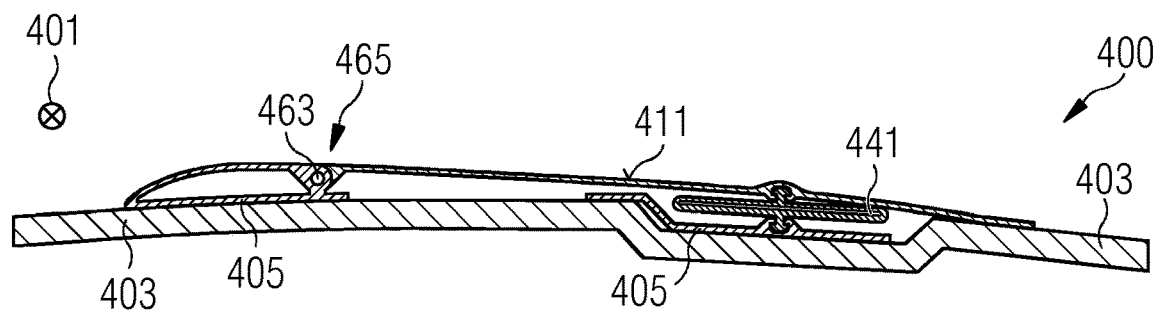
Figure 12:
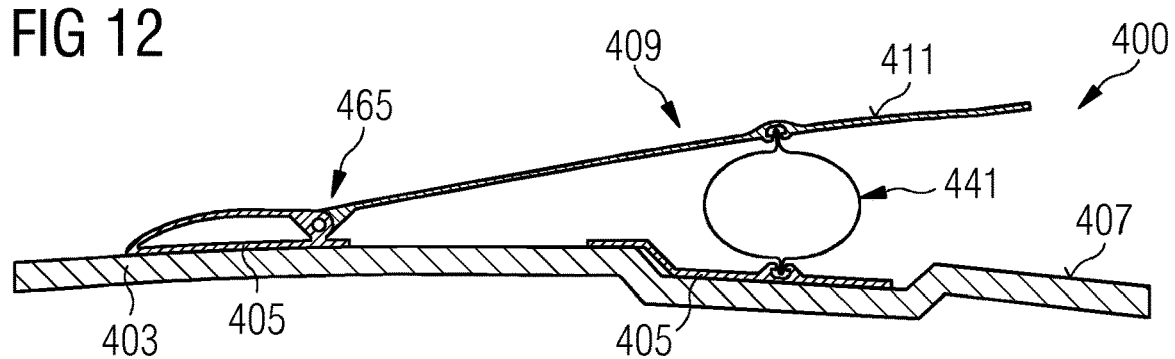
Figure 13:
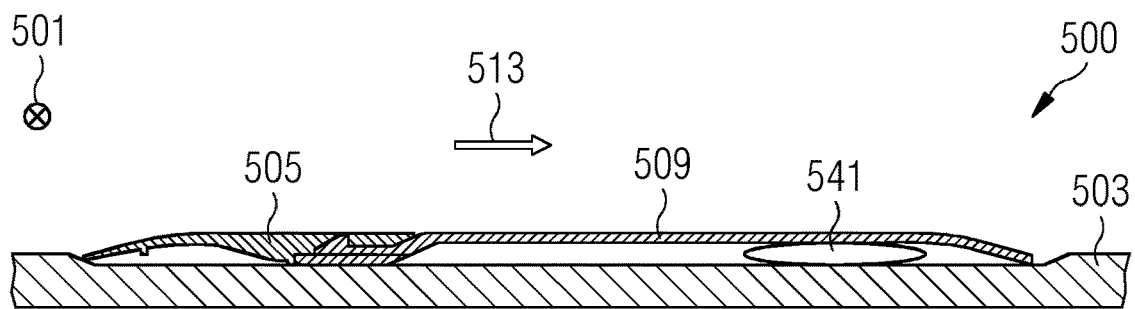
Figure 14:
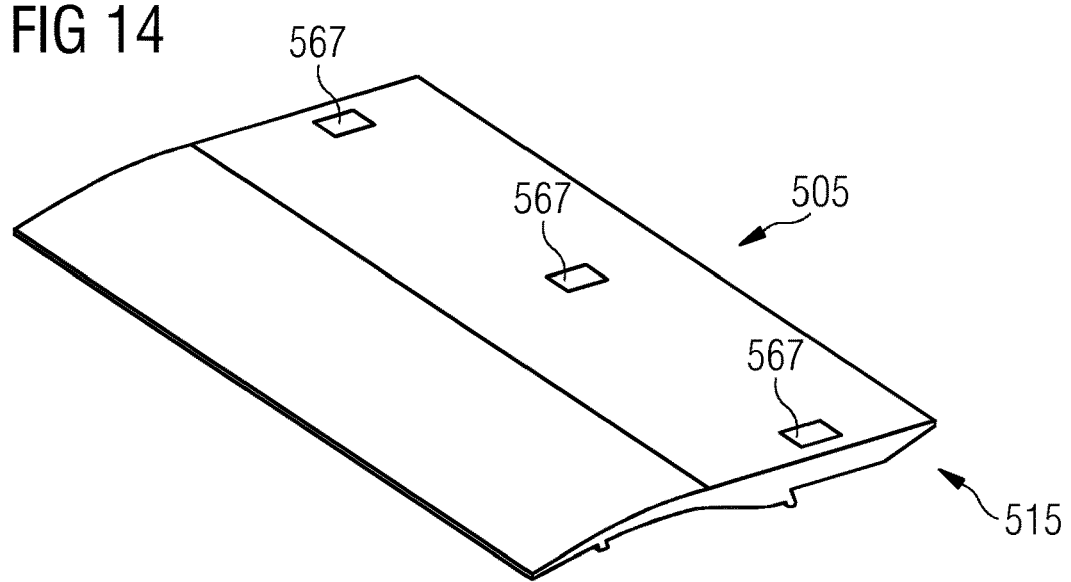
Figure 15:
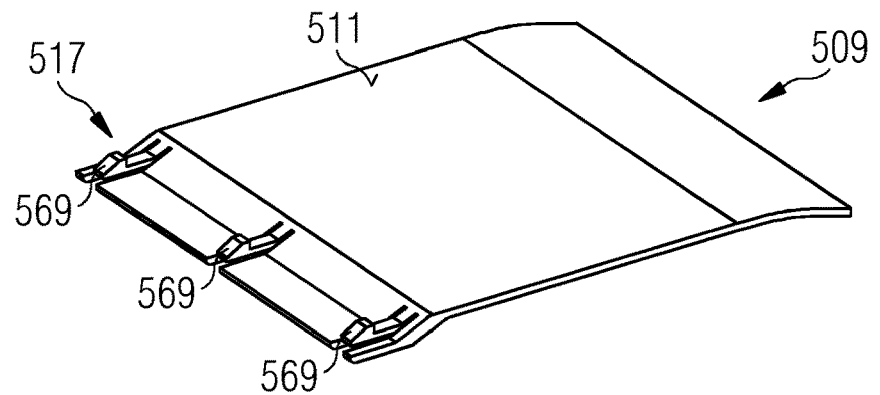
Figure 16:
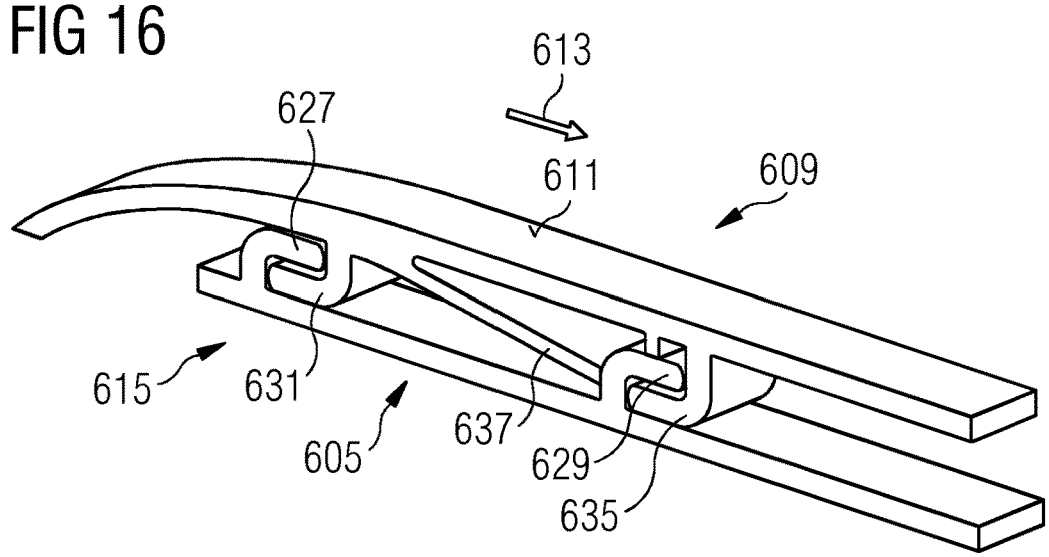
Figure 17:
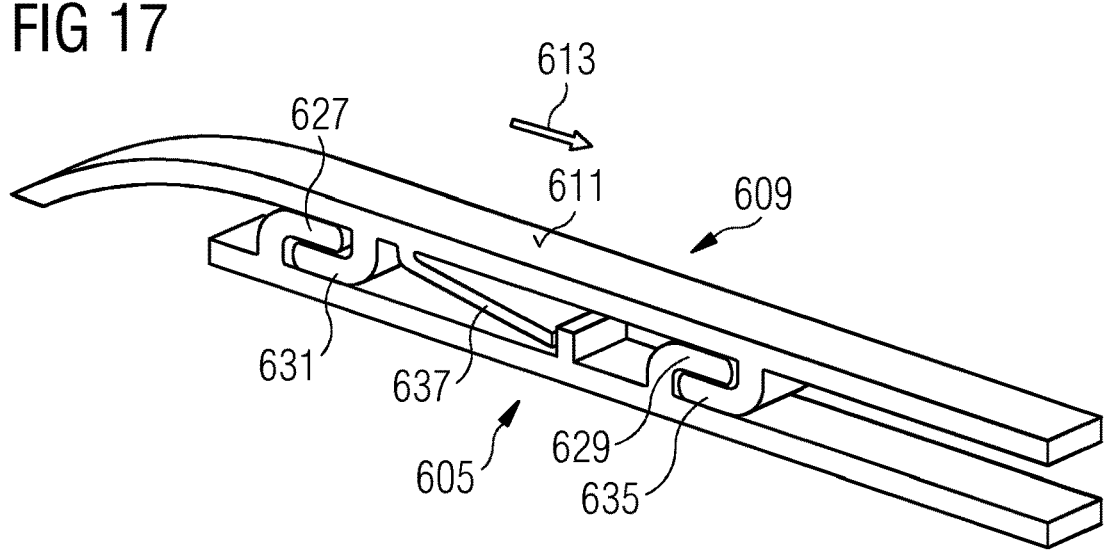
Figure 18:
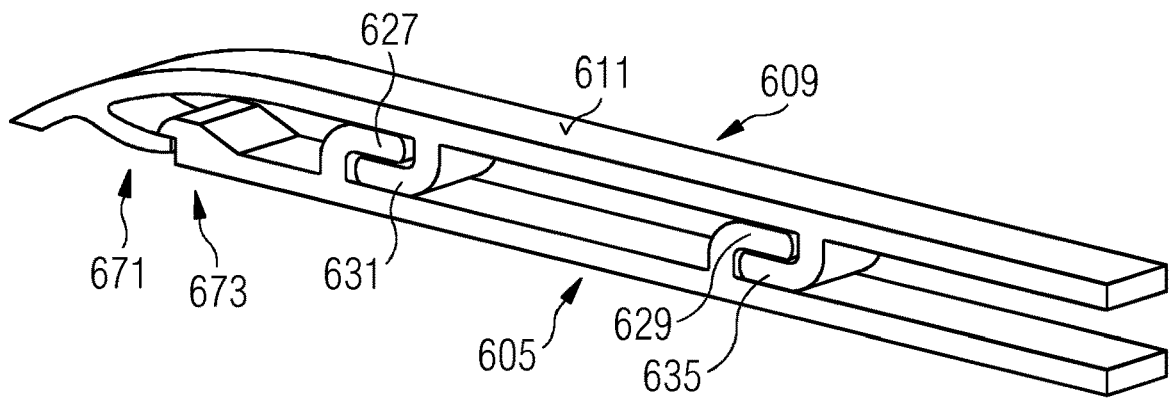

Some of the embodiments will be described in detail, with reference to the following figures, wherein like designations denote like members, wherein:

FIG. 1 schematically illustrates an adaptable spoiler in a disassembled state according to an embodiment of the present invention;

FIG. 2 schematically illustrates an adaptable spoiler in a partial view according to an embodiment of the present invention;

FIG. 3 schematically illustrates an adaptable spoiler in an assembled state according to an embodiment of the present invention;

FIG. 4 schematically illustrates an adaptable spoiler in a schematic sectional side-view in an assembled state according to an embodiment of the present invention;

FIG. 5 schematically illustrates an adaptable spoiler in a schematic sectional side-view in an assembled state and in a first partial view according to an embodiment of the present invention;

FIG. 6 schematically illustrates an adaptable spoiler in a schematic sectional side-view in an assembled state and in a second partial view according to an embodiment of the present invention;

FIG. 7 schematically illustrates an adaptable spoiler according to an embodiment of the present invention in an assembled state;

FIG. 8 schematically illustrates an adaptable spoiler according to an embodiment of the present invention in a first partial view;

FIG. 9 schematically illustrates an adaptable spoiler according to an embodiment of the present invention in a second partial view;

FIG. 10 schematically illustrates in a perspective view an adaptable spoiler according to an embodiment of the present invention;

FIG. 11 schematically illustrates in a perspective view an adaptable spoiler according to an embodiment of the present invention and in a first sectional side-view in an assembled state;

FIG. 12 schematically illustrates in a perspective view an adaptable spoiler according to an embodiment of the present invention and in a second sectional side-view in an assembled state;

FIG. 13 schematically illustrates in a sectional side-view an adaptable spoiler according to an embodiment of the present invention;

FIG. 14 schematically illustrates an adaptable spoiler according to an embodiment of the present invention in a perspective view of a first portion;

FIG. 15 schematically illustrates an adaptable spoiler according to an embodiment of the present invention in a perspective view of a second portion;

FIG. 16 schematically illustrates in a first perspective view attachment portions comprised in an adaptable spoiler according to an embodiment of the present invention;

FIG. 17 schematically illustrates in a second perspective view attachment portions comprised in an adaptable spoiler according to an embodiment of the present invention; and FIG. 18 schematically illustrates in a third perspective view attachment portions comprised in an adaptable spoiler according to an embodiment of the present invention.

DETAILED DESCRIPTION

Elements, similar in structure and/or function are labelled in the drawings with reference signs differing only in the first digit. The description of one element not in particular or in detail described with reference to one embodiment may be taken from the description of the respective element of another embodiment.

The adaptable spoiler 100 as schematically illustrated in FIG. 1 along a longitudinal axis 101 of a rotor blade 103 in a sectional side-view comprises a base element 105 which is adapted to be connected at or integrated with a rotor blade surface 107 of the rotor blade 103 which is partly illustrated in FIG. 1. The adaptable spoiler 100 further comprises an airfoil element 109 which is (e.g., reversibly or permanently) attachable to the base structure 105 (for example illustrated in FIG. 3) and having an airfoil shaped surface 111 to be exposed to an air flow 113 during operation of a wind turbine. The airfoil element 109 comprises an encapsulated core 110 providing enforcement.

The rotor blade 103 has a longitudinal axis 101 which is substantially perpendicular to the flow direction 113 of the air during operation of the wind turbine. The base element 105 comprises at least one attachment portion 115 and also the airfoil element 109 comprises at least one attachment portion 117. Thereby, the attachment portions 115 and 117 of the base element 105 and the airfoil element 109 are engageable with each other, as is for example illustrated in FIG. 3.

As can be taken from FIG. 1, the attachment portion 115 of the base element 105 is arranged in an upstream region 119 of the base element 105, in particular in a region between 5% and 50% of the entire extent lbe of the base element along the flow direction 113. Furthermore, the attachment region 117 of the airfoil element 109 is also arranged within an upstream region 121 of the airfoil element 109, in particular in a region between 0% and 50% of an entire extend lae of the airfoil element.

FIG. 1 illustrates a disassembled state, in which the airfoil element 109 is not attached to the base element 105. As can be appreciated from FIG. 1, the airfoil element 109 is pre-bent such that upon attaching the airfoil element 109 at the base element 105 (as illustrated in FIG. 3) the rear edge 123 of the airfoil element 109 presses upon the surface 107 of the rotor blade 103. Thus, the airfoil element 109 presses in a downstream region 125 towards the rotor blade surface 107 or in other embodiments towards the base element 105.

Below it is referred to a chordwise direction 113 that is a direction that points from the leading edge towards the trailing edge of the rotor blade. During normal operation the chordwise direction 113 is along an airflow direction. In the following the airflow direction is meant to be equal to the chordwise direction.

The attachment portion 115 of the base element 105 comprises in the illustrated embodiment two noses 127, 129 being spaced apart in the chordwise direction or airflow direction 113 and pointing according to the flow direction 113 downstream. Also, the attachment portion 117 of the airfoil element 109 comprises two noses 131, 133 also being spaced apart in the flow direction 113 but pointing towards upstream. When the airfoil element 109 is attached to the base element 105 (see FIG. 3), the noses 131, 133 of the attachment region 117 of the airfoil element 109 engage below the noses 127, 129 of the base element 105. Furthermore, an elastic tongue 137 of the attachment region 117 of the airfoil element 109 is bent in the assembled state and contacts a protrusion 139 comprised in the attachment portion 115 of the base element.

The adaptable spoiler 100 illustrated in FIGS. 1, 2 and 3 further comprises an inflatable, expandable container 141, for example configured as a bag or a hose and made from elastic deformable material. The container is illustrated in FIG. 1 in a disassembled and deflated state and in FIG. 3 in an assembled state. The expandable container 141 comprises a lumen 143 which is fillable with a fluid, such as air. Filling the lumen 143 of the container 141 to a different agree will expand the container 141 to a different degree thereby touching and pushing a back-surface 145 of the airfoil element 109 for flexing upwards the airfoil shaped surface 111 of the airfoil element, thereby achieving different states of the adaptable spoiler 100.

The container 141 is fixable at or to the base element 105. Therefore, the container 141 comprises an engagement portion 147 and the base element comprises a respective engagement portion 149 in particular in a downstream region 151 of the base element 105. The engagement portions 147 and 149 of the container 141 and the base element 105, respectively, are engageable with each other. In particular, also the engagement portion 147 of the container comprises noses which latch or catch below noses of the engagement portion 149 of the base element.

FIG. 2 schematically illustrates in more detail a portion of the airfoil element 109 showing the attachment region 117.

When the inflatable container 141 is inflated to a different degree, a state sketched in dashed lines in FIG. 3 is achieved. In particular, the container is now labelled with reference sign 141' and the airfoil shaped surface of the airfoil element 109 is labelled with reference sign 111'. It can be seen from FIG. 3 that the position and/or orientation and/or shape of the downstream portion 125 of the airfoil element 109 is changed, while the position and/or orientation and/or shape of the airfoil element 109 is substantially unchanged in the upstream region 121.

As can be seen in FIG. 1, the rotor blade surface has in the region of the attached base element 105 a slight depression as indicated with Δ. Thus, the base element 105 is slightly submerged into the rotor blade 103.

FIGS. 4 to 6 illustrate in a sectional side-view an adaptable spoiler 200 according to another embodiment of the present invention, wherein FIGS. 5 and 6 illustrate partial views. Similar to the embodiment of the adaptable spoiler 100 illustrated in FIGS. 1, 2 and 3, also the base element 215 of the spoiler 200 comprises an attachment portion 215 in an upstream region 219. Thereby, the attachment portion 215 comprises hook-like protrusions 227, 229 which engage with an attachment portion 217 of the airfoil element 209 having the airfoil shaped surface 211. Thereby, the attachment portion 217 comprises a front nose 231 pointing downstream and a further nose 235 (or hook) pointing upstream. In contrast, the nose 227 of the base element 205 points upstream engaging with the downstream directed nose 231 of the airfoil element 209. The downstream directed nose or hook 229 of the base element 205 engages with the upstream pointing nose 235 of the airfoil element 299.

Also, the adaptable spoiler 200 comprises an inflatable, expandable container 241 between a downstream portion 225 of the base element 205 and the airfoil element 209 (see FIG. 6). Also, the container 241 is attached via an engagement portion 247 via an engagement portion 249 to the base element 205 in the downstream region 225. Additionally, however to the embodiment of the spoiler 100 illustrated in FIGS. 1 to 3, the airfoil element 209 comprises also an engagement portion 253 which is engaged with a further engagement portion 255 of the container 241. In particular, the engagement portions 247, 255 of the base element 205 and the airfoil element 209, respectively, are configured as recesses into which protrusions of respective engagement portions of the container 241 are inserted thereby being hold by a latching or interlocking mechanism. For inserting the protrusions 255, 247 of the container 241 into the recesses 249, 253 the protrusions 255, 247 having an extended head portion may slightly be formed.

The base element 205 illustrated in FIGS. 4 and 5 is slightly submerged by an amount Δ into the rotor blade 203.

FIGS. 7, 8 and 9 illustrate another adaptable spoiler 300 according to an embodiment of the present invention, wherein FIGS. 8 and 9 illustrate partial views. While the base elements 105, 205 illustrated in FIGS. 1, 4 and 5 are submerged over their entire length, most of the base element 305 of the adaptable spoiler 300 illustrated in FIGS. 7, 8 and 9 is arranged at the unchanged rotor blade surface having no depression in the entire extent of the base element 305. However, a depression of the rotor blade surface is present in a downstream region 357 in which the depression amounts to a value Δ. Outside the downstream region 357 there is no depression of the rotor blade surface 307. The depression Δ allows for accompanying the expandable inflatable container 341 which may be configured similarly to the container 241 of the adaptable spoiler 200 illustrated in FIGS. 4, 5 and 6. Furthermore, the attachment portion 315 of the base element 305 comprises an upstream pointing nose 327 being engaged with a downstream pointing nose 331 of the airfoil element 309. Furthermore, the base element 305 comprises a downstream directed nose 329 being engaged with an upstream directed nose 335 of the airfoil element 305. In the region 357 of the depression of the rotor blade, the base element 305 is submerged into the rotor blade.

FIGS. 10, 11 and 12 illustrate an adaptable spoiler 400 according to an embodiment of the present invention. An airfoil element 409 is attachable to a base element 405 by a hinge mechanism 465 which forms the respective attachment portion. The base element as well as the airfoil element 405, 409 both comprise a through-hole 459, 461 through which a pin 463 is insertable to establish the hinge 465 (see FIGS. 11 and 12). The pin 463 and the through-holes 459, 461 substantially are oriented along the longitudinal axis 401 of a rotor blade at which the adaptable spoiler 400 is mounted. Thus, in the adaptable spoiler 400 illustrated in FIGS. 10, 11, 12 the attachment portions 417 and 415 of the airfoil element 409 and the base element 405, respectively, are formed by the portions having the through-holes 459, 461, respectively.

The downstream region of the base element 405 as well as the airfoil element 409 have similarities to those of the adaptable spoiler 300 illustrated for example in detail in FIG. 9. While FIG. 11 illustrates the spoiler while the container 441 is deflated, FIG. 12 illustrates the situation, where the container 441 is inflated such that the airfoil shaped surface 411 of the airfoil element 409 is tilted upwards away from the rotor blade surface 407, thereby setting the adaptable spoiler 400 in a particular activation state.

FIGS. 13, 14 and 15 illustrate schematically an adaptable spoiler 500 according to still a further embodiment, while in FIG. 14 the base element 505 is illustrated and wherein in FIG. 15 only the airfoil element 509 is illustrated. The attachment portion 515 of the base element 505 comprises holes 567 and not in detail illustrated guide edges. Elastic support protrusions or latching noses 569 comprised in the airfoil element 509 represent the respective attachment portion 517 of the airfoil element 509. These elastically held noses 569 will slip into the openings 567 for (reversibly or permanently) attaching the airfoil element 509 with the base element 505.

FIGS. 16, 17, 18 illustrate further variants or embodiments of attachment portions of on one hand the base element 605 and on the other hand the airfoil element 609 which may be comprised in the adaptable spoiler according to embodiments of the present invention. In the illustrated embodiments, the base element 605 has as attachment portion 615 downstream directed noses which engage with upstream directed noses 631, 635 of the airfoil element 609. While the FIGS. 16 and 17 illustrate an elastic tongue 637, which end is interlocked with a protrusion 639 at the or of the base element 605, in FIG. 18 a front portion 671 of the airfoil element 609 interlocks with a front portion 673 of the base element for avoiding releasing the airfoil element unintentionally by sliding it in a downstream direction.

Embodiments of the present invention may provide several benefits:
Simple and fast installation
Simple and fast repair/exchange/service of elements
Simple manufacturing
increase of drag level when desired,
fast power control,
additional degree of freedom for control of aerodynamic forces on blades.

Embodiments may be applied to at least one of the following:
Selective reduction of loading at different positions along the spanwise direction at different wind speeds,
increase of aerodynamic damping at high wind speeds, or when else required
reduction of aerodynamic loading during over-speed situations,
reduction of aerodynamic loading during idling,
reduction of aerodynamic loading during manual, emergency, or normal shutdown events,
reducing pitch activity by combination of pitching and activation of the flow-regulating device,
activation of spoiler in combination with individual pitch control.

There are a number of possible activations:
Activation depending on the rotor speed of the turbine
Slow activation (for example depending only on wind speed),
Fast activation (for example 1P or 3P for a combination with IPC)
on/off activation (for example for over-speed, shutdown events, events with extreme high turbulence),
persistent activation (for example for idling),
independent activation of different spoiler sections on the blade Independent activation of different spoiler sections on the blade to maintain the rotor speed at the nominal level Possible pressure supply system characteristics include the following:

activation by a pressurized fluid, in particular pressurized air, pressurized dry air, or any other gas such as inert gases (e.g. nitrogen or helium)

low required volume of air (achieved for example by controlling a change of shape in the pressurized chamber, rather than an expansion of the chamber), pressurized reservoirs close to the points of activation (for rapid response and reduction of power requirements for the supply system). This can be done for example by placement of tubes of larger diameter internally in the blade close to the pressure supply points, simultaneous connection to pressure and vacuum chambers to increase response speed, constant flow through a purge valve to avoid accumulation of humidity/dirt/compression oil, etc.

use of pre-heated air in case icing could be an issue, independent activation of different radial segments, use of control valves at particular stations to avoid/permit flow of pressurized air from one radial position to a further radial position, use of pneumatically activated pneumatic valves (to avoid electrical signals), use of stagnation pressure at some radial station as input to pneumatic control valves, use pitch position as input to pneumatic control valves (for example high pitch position file open valves and thus activate the spoiler), Use the rotor speed as input to pneumatic control valves (for example high rotor speed may lead to opening of valves and thus activation of the spoiler), Use of turbulence level as input to pneumatic control valves.

In the flow spoiler there may be no need for an electrical or mechanical component.

According to embodiments of the present inventions the following features are provided that may be applied to all embodiments described above, alone or in combination:

The container's shape may be optimized to reduce friction distance with the airfoil element. The container may therefore typically be non-symmetric;

the container's foot may also be non-symmetric in order to forbid mounting in the wrong direction;

low friction strips can be added on the airfoil element and/or the container at specific locations to reduce the wear the base element may be produced as one element to ensure a consistent relative positioning between the airfoil element and the container, or, inversely, as two elements to enable different relative positioning and hence different lifting heights for the same container and/or airfoil element;

the container may integrate an elastic element, for example fiber reinforced, to assist in deflating.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An adaptable spoiler for a wind turbine rotor blade, comprising:
    a base element configured to be connected at or integrated with a rotor blade; and
    an airfoil element attachable to the base element and having an airfoil shaped surface to be exposed to an air flow;
    wherein for attaching the airfoil element to the base element, the airfoil element and the base element each comprise:
    at least one attachment portion;
    wherein an attachment portion of the airfoil element protrudes from a back surface of the airfoil element towards the base element and an attachment portion of the base element protrudes towards the back surface of the airfoil element, and the attachment portion of the airfoil element and the attachment of the base element are configured to be fixed to each other;
    wherein the attachment portion of the airfoil element and the attachment portion of the base element are arranged in an upstream region according to a chordwise direction, to allow deformation away from the rotor blade, of the airfoil element in a downstream region for adapting the adaptable spoiler into different activation states.

2. The adaptable spoiler according to claim 1, wherein the airfoil element is flexible and is, when attached at the base element, biased to press towards the base element and/or the rotor blade surface in a downstream region.

3. The adaptable spoiler according to claim 1, wherein for fixing the attachment portion of the airfoil element and the attachment portion of the base element with each other, at least a part of one attachment portion, is elastic and is temporarily deformed.

4. The adaptable spoiler according to claim 1,
    wherein the airfoil element is fibre enforced, and/or
    wherein the airfoil element comprises a core made from fibre enforced material, the airfoil element further comprising a surrounding material encapsulating the core.

5. The adaptable spoiler according to claim 1, wherein the attachment portion of the airfoil element and the attachment portion of the base element are attachable with each other by form fit,
    wherein the attachment portion of the airfoil element and/or the attachment portion of the base element comprise at least one of:
    a protrusion;
    a nose;
    a hook;
    an elastic tongue; and
    a barb.

6. The adaptable spoiler according to claim 1, wherein the attachment portion of the airfoil element and/or the attachment portion of the base element has a cross-sectional shape not changing along a span-wise direction of the rotor blade, thereby being manufacturable by an extrusion process.

7. The adaptable spoiler according to claim 1, further comprising:
    at least one pin,
    wherein the attachment portion of the airfoil element, the attachment portion of the base element and a pin form a hinge by which the airfoil element and the base element are rotatably connected to each other, a rotation axis substantially being oriented along a longitudinal direction of the rotor blade.

8. The adaptable spoiler according to claim 1,
wherein at most an upstream portion of the base element is to be exposed to air flow, and/or
wherein a downstream portion of the base element is substantially covered by the airfoil element, and/or
wherein the base element is partly or completely submerged below a surrounding rotor blade airfoil surface.

9. The adaptable spoiler according to claim 1, further comprising:
an inflatable, expandable container arranged in a downstream region at least partly between the base element and the airfoil element and configured to be expanded to a different level to change a position and/or an orientation and/or a shape of at least a portion of the airfoil shaped surface of the airfoil element.

10. The adaptable spoiler according to claim 9, wherein the container comprises an engagement portion,
wherein the base element comprises an engagement portion in a downstream region engageable with the engagement portion of the expandable device for fixing the container at the base element.

11. The adaptable spoiler according to claim 10, wherein the airfoil element is configured such that upon inflating the container:
a position and/or an orientation and/or a shape of a downstream portion of the airfoil shaped surface of the airfoil element changes,
while a position and/or an orientation and/or a shape of an upstream portion of the airfoil shaped surface of the airfoil element substantially remains unchanged.

12. A wind turbine rotor blade, comprising:
a blade airfoil surface; and
the adaptable spoiler according to claim 1, wherein the base element is laminated to and/or is glued to and/or is mechanically fastened to the blade airfoil surface.

13. A wind turbine, comprising:
a rotor; and
at least one wind turbine rotor blade according to claim 12 mounted at the rotor.

* * * * *